(12) United States Patent
Gleinig et al.

(10) Patent No.: US 8,007,611 B2
(45) Date of Patent: Aug. 30, 2011

(54) METHOD FOR THE PRODUCTION OF COMPOSITE ELEMENTS BASED ON MINERAL OR ORGANIC THERMAL INSULATION MATERIALS WITH THE AID OF AN ADHESIVE

(75) Inventors: Erhard Gleinig, Senftenberg (DE); Erwin Calgua, Edenkoben (DE); Michael Thater, Goldenstedt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 919 days.

(21) Appl. No.: 11/913,693

(22) PCT Filed: May 11, 2006

(86) PCT No.: PCT/EP2006/062254
§ 371 (c)(1),
(2), (4) Date: Nov. 6, 2007

(87) PCT Pub. No.: WO2006/120234
PCT Pub. Date: Nov. 16, 2006

(65) Prior Publication Data
US 2008/0223518 A1 Sep. 18, 2008

(30) Foreign Application Priority Data
May 13, 2005 (DE) .......... 10 2005 023 109

(51) Int. Cl.
*B32B 37/12* (2006.01)
*B29C 65/52* (2006.01)
*B05B 3/02* (2006.01)
(52) U.S. Cl. .......... 156/62.2; 156/324; 156/331.4; 239/223
(58) Field of Classification Search .......... 156/62.2, 156/62.4, 324, 331.4; 264/128; 239/223, 239/224
See application file for complete search history.

(56) References Cited

U.S. PATENT DOCUMENTS

| 3,297,474 A | 1/1967 | Shields |
| 3,349,568 A | 10/1967 | Smith et al. |
| 3,475,198 A * | 10/1969 | Drum .......... 427/482 |
| 5,296,303 A | 3/1994 | Bravet et al. |

FOREIGN PATENT DOCUMENTS

| DE | 2 412 686 | 10/1974 |
| DE | 28 08 903 | 9/1979 |
| FR | 2 837 743 | 10/2003 |
| GB | 2 164 872 | 4/1986 |
| JP | 11-179245 A * | 7/1999 |
| WO | 99 59730 | 11/1999 |

OTHER PUBLICATIONS

Abstract and Machine Translation for JP 11-179245 A. Date Unknown.*

* cited by examiner

*Primary Examiner* — Michael A Tolin
(74) *Attorney, Agent, or Firm* — Oblon, Spivak, McClelland, Maier & Neustadt, L.L.P.

(57) ABSTRACT

The invention provides a method for the production of composite elements composed of at least one outer layer a) and a thermal insulation material b), where between the outer layer a) and the thermal insulation material b) an adhesive c) has been applied, the outer layer a) being moved continuously, the thermal insulation material b) being applied to the outer layer a) and, if appropriate, a further outer layer a) being applied to the thermal insulation material b), and the adhesive c) being applied to the thermal insulation material b) or to the outer layer a), which comprises applying the adhesive c) by means of a rotating flat body which is mounted horizontally or with a slight deviation from the horizontal, of up to 15°, preferably parallel to the outer layer a) or to the thermal insulation material b).

13 Claims, 4 Drawing Sheets

METHOD FOR THE PRODUCTION OF COMPOSITE ELEMENTS BASED ON MINERAL OR ORGANIC THERMAL INSULATION MATERIALS WITH THE AID OF AN ADHESIVE

The invention relates to a method for the production of composite elements composed of at least one outer layer and a thermal insulation material, examples being mineral fiberboard sheets or sheets of expanded polystyrene (EPS), using an adhesive.

The production of composite elements composed in particular of metallic outer layers and a core composed of a thermal insulation material is known. More particularly the production of sheets which comprise a mineral wool core, frequently also termed mineral wool sandwich elements, on continuous twin-belt systems is currently being realized to an ever greater extent. The key advantage of such elements, besides their usefulness as construction elements, lies in their high level of resistance to flame exposure. Mineral wool sandwich elements are used in particular for designing facings and roofs of a very wide variety of buildings where a very high level of fire protection is a key factor. Outer layers used in such application, besides coated steel sheets, also include stainless steel sheets, copper sheets or aluminum sheets.

Compounds which have become established for the adhesive bonding of the core material, more particularly of the mineral wool boards, to one another or to the metallic outer layers are one- or two-component isocyanate-based adhesives. Bonding to the metallic outer layers may take place in a variety of ways. For example it is possible to apply an activated polyol component and an isocyanate component separately from one another to the metal sheet, in the form of drops or tracks of liquid, and to carry out mixing using an oscillating wiper blade. A disadvantage of this simple method is the inadequate quality of mixing and the resultant high level of material consumption for only moderate adhesive properties. The reaction mixture can also be produced mechanically using high-pressure or low-pressure technology and applied to the metal sheet or mineral wool by means of oscillating casting rakes or as a spray jet. Using a casting rake requires a relatively large quantity of adhesive, since at low throughputs the casting pipe clogs up very easily and must be changed at frequent intervals. In many places, therefore, the spray jet has become established. This mode of application too, however, has disadvantages. The speed of the continuous twin belt is limited by the maximum possible oscillation speed of the mixing head. A further disadvantage is that, with increasing oscillation, more adhesive is applied in the marginal region and less in the middle region of the outer layer. This leads to inadequate adhesion between core material and outer metal layer. Moreover, this procedure offers the risk of formation of aerosols. These aerosols are a health hazard and also contaminate the exhaust-air systems on the twin-belt systems.

The aim, therefore, was to find a method which distributes an adhesive, more particularly an isocyanate-based adhesive, very uniformly over outer layers and/or core material, which does not restrict the production rate, which does not form aerosols, and which, despite a small quantity of adhesive, ensures sufficient adhesion. The method ought to be able to be used continuously or discontinuously. A discontinuous procedure may be appropriate, for example, when starting up the twin belt and in the case of presses which operate discontinuously.

One possible way of ensuring adhesion with a low level of materials used is to apply the adhesive, which preferably constitutes an optimally mixed polyurethane reaction mixture, as droplets to the outer layers or the core material. The droplets are easy to generate and distribute by applying the adhesive continuously to a rotating disk and spinning the reaction mixture. Circular disks have the disadvantage that they too result in accummulations of material in the edge region at the expense of the droplet density in the central region of the element.

One method very similar to spin coating likewise utilizes a rotating apparatus. In this case, however, the substance is spun away laterally as a result of the rotation of the disk. This technique is particularly good for coating pipes or other hollow cavities from the inside, as described for example in U.S. Pat. Nos. 3,349,568, DE 2808903, and WO 9959730. A development of this technique is used for coating moldings and also metal sheets. With all of these methods, however, the outer layers for coating are guided around the rotating disk, and the substance is spun from the disk, always in the lateral direction, onto the outer layer in question, as described for example in DE 2412686. For improved application, one portion is additionally subjected to an electrostatic field. With all of these methods, however, aerosols may form to a large extent, which are environmental hazards and harmful to health.

It was an object of the present invention, then, to find a suitable application method for an adhesive to a horizontal metal sheet or a platelet-shaped insulation material, said method being suitable for producing sandwich elements, not releasing any aerosols, being low-maintenance, not restricting the production rate of the twin-belt system, and ensuring highly uniform distribution of the adhesive over the width of the panel.

It has been possible to achieve this object, surprisingly, by applying the adhesive to the outer layer via a flat rotating body which is located in the horizontal, preferably parallel to the outer layer or to the board substrate. This body may have the form of a preferably four- or five-pointed planar star, a four- or five-pointed star with the points curved upward, or a planar disk having borders ascending in a cascade-like manner.

Figure 1:
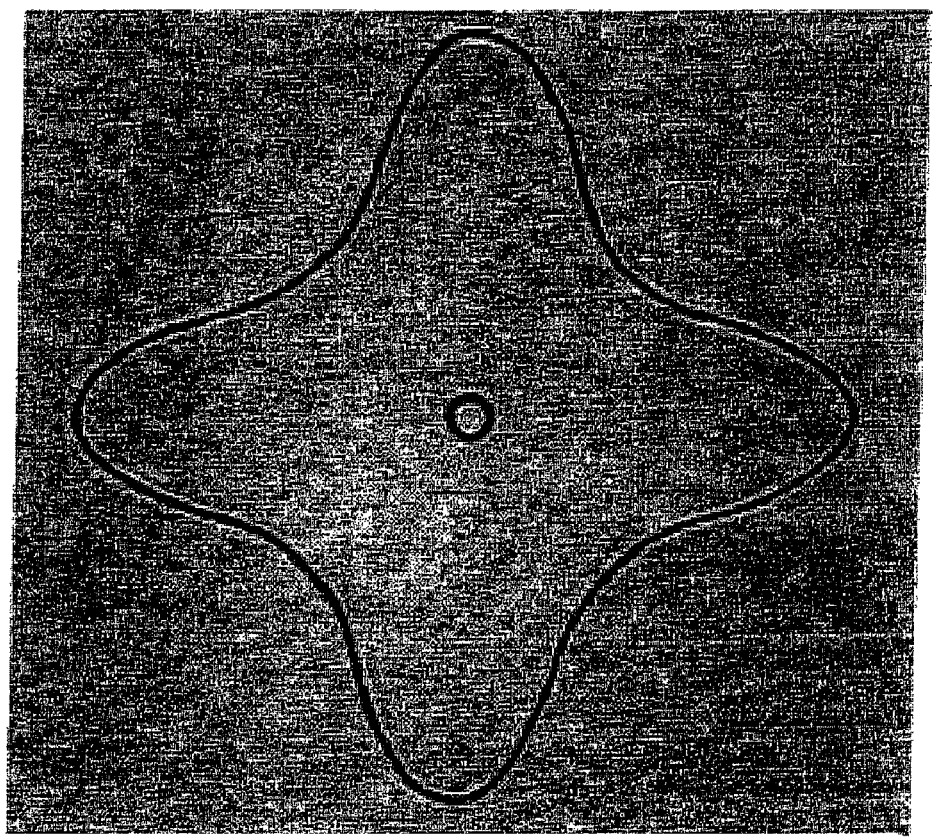
FIG. 1 shows the plan view of a four-pointed star which has no straight lines.

The invention accordingly provides a method for the production of composite elements composed of at least one outer layer a) and a thermal insulation material b), where between the outer layer a) and the thermal insulation material b) an adhesive c) has been applied, in particular an isocyanate-based adhesive, the outer layer a) being moved continuously, and the adhesive c) being applied to the thermal insulation material b) and/or to the outer layer and outer layer a) and thermal insulation material b) being joined to one another, which comprises applying the adhesive c) by means of a rotating flat body which is mounted horizontally or with a slight deviation from the horizontal, of up to 15°, preferably parallel to the outer layer or to the insulation material b).

The invention further provides an apparatus for the production of composite elements composed of at least one outer layer a) and an insulation material b), the insulation material being joined to one another with an adhesive c), comprising continuous feeding of the outer layers a) and of the insulation material b), and also an apparatus for applying the adhesive c), wherein the adhesive c) is applied by means of a rotating flat body which is mounted horizontally or with a slight deviation from the horizontal, of up to 15°, preferably parallel to the outer layer a) or to the insulation material b).

The invention further provides an apparatus for applying liquids to a continuously conveyed substrate, more particularly an outer layer or an insulation material of composite elements, wherein the apparatus comprises a rotating flat body mounted horizontally, preferably parallel over the outer layer or the insulation material, the liquid being applied to said body and spun away by the rotation of the edge or of the surface of the body, and then passing onto the outer layer and/or the insulation material.

As the outer layer it is possible to use plasterboard panels, glass tile, aluminum foils, aluminum sheets, copper sheets or steel sheets, preferably aluminum foils, aluminum sheets or steel sheets, and with particular preference steel sheets. The steel sheets may be coated or uncoated. Preferably they are not corona-treated.

The outer layer is transported preferably at a constant speed of 2-15 m/min, more preferably 3-12 m/min, with particular preference 3-9 m/min. From the point where the adhesive is applied, the outer layer or insulation material is in a horizontal or slightly inclined position.

The composite elements may comprise only one outer layer, to which the thermal insulation material b) is joined.

In the case of the typical sandwich elements the thermal insulation material is enclosed by a lower outer layer and an upper outer layer. For production it is necessary for both outer layers to be bonded to the mineral or organic insulation material. For bonding the upper outer layer to the thermal insulation material, the adhesive can be applied to the upper outer layer or to the thermal insulation material. Application to the upper outer layer takes place preferably likewise using the apparatus of the invention for applying the adhesive.

In the method of the invention for the production of the composite elements, and when using metal sheets or foils as outer layers, the outer layers are successively unwound from coils, profiled if appropriate, heated, and corona-treated if appropriate. Thereafter the adhesive is applied to the outer layers or the insulation material and the elements are passed through the heated double sheet belt, where actual bonding takes place and the adhesive cures. A saw cuts the continuous strand to the desired element length.

It is advantageous here for the distance between the application of the adhesive and the moment of contact between outer layers and the insulation material boards to be small. This minimizes the waste produced by this method at the start and the end and also in the event of unforeseen interruptions in the production operation.

The discharge of the adhesive for the bonding of the lower outer layer to the insulation material or of the insulation material to the upper outer layer takes place, as described, by way of a rotating flat body which is mounted horizontally, preferably parallel over the lower outer layer, and can be set in rotation by way of a drive. The rotating body can also be mounted with a deviation of up to 15° from the horizontal. The rotating body may preferably possess the form of a four- or five-pointed planar star, which in plan view has rounded-off points and no straight lines, or of a planar circular disk having borders ascending outwardly in a cascade-like manner, on the top face, and outlet openings, more particularly holes, located therein.

FIG. 1 shows the plan view of a four-pointed star which has no straight lines. In this case the adhesive is supplied preferably through the middle.

The drops spin away from the star-shaped disk at the upper edge. The star is flat and preferably between 0.5 and 20 mm thick. Depending on the width of the composite elements, it has an external radius of 4 to 30 cm and an internal radius of 1 to 20 cm. Preferably the external radius is between 5 and 20 cm and the internal radius is between 2 and 10 cm. The star is manufactured from materials to which polyurethanes stick little if at all. Preference is given to using polyolefins, such as polyethylene, polypropylene, Teflon, or metallic supports coated with these polymers. The whole outside edge of the star, as described above, is of curved configuration, so that in plan view there is no straight line and no acute or obtuse angle. The internal radius represents the closest distance of the outside edge from the centerpoint of the axle (1) on which the star is fixed, and the external radius represents the corresponding furthest point. If appropriate, the spin-off edge can be provided with 2 to 10 additional notches.

Figure 2:
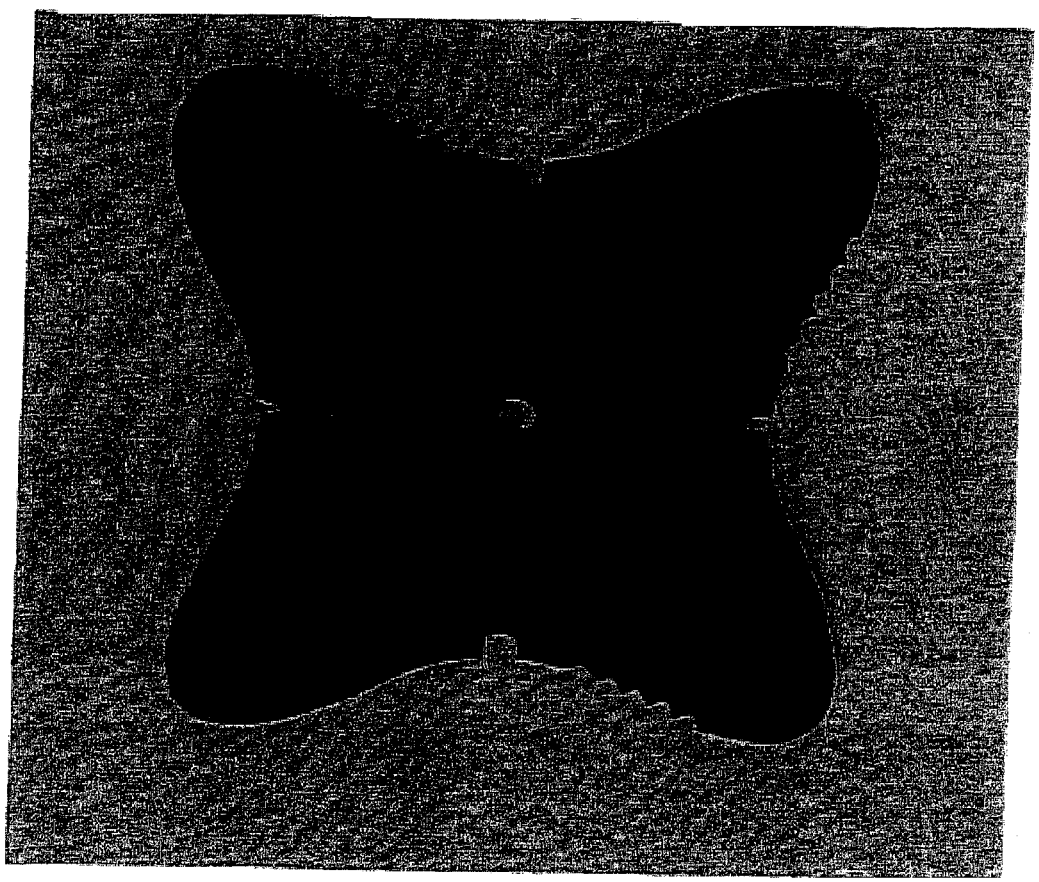
FIG. 2 shows a star with a spin-off edge provided with notches.

A star of that kind is depicted in FIG. 2. The spin-off edge is the long edge of one star arm that is situated in each case in the slipstream of the direction of rotation.

Figure 3:
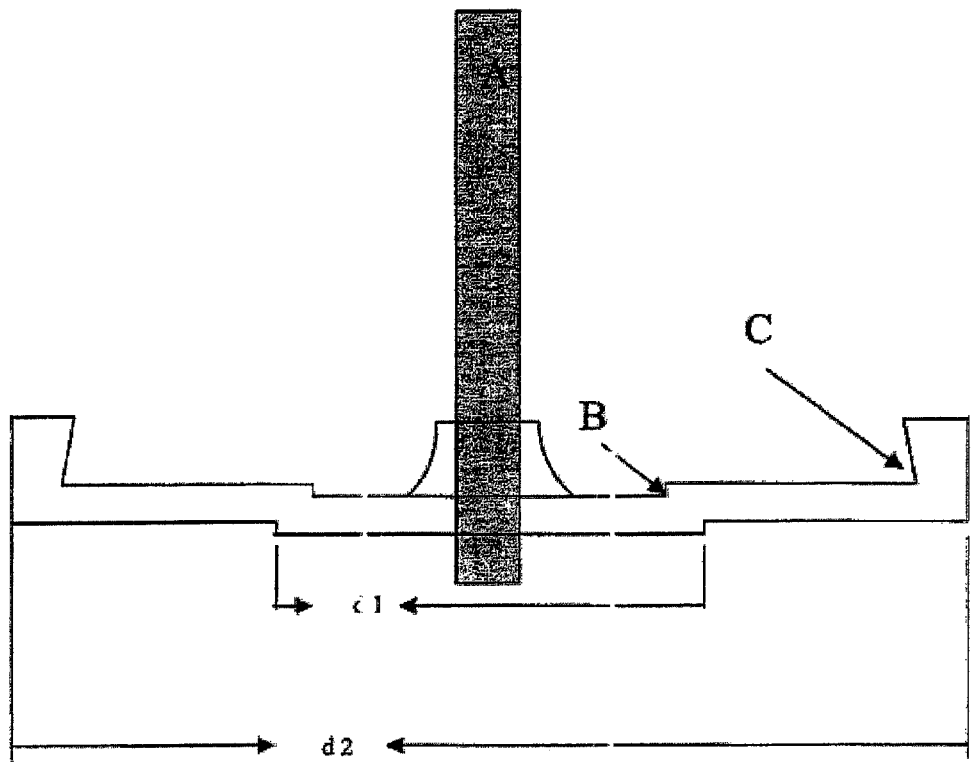
FIG. 3 shows the side view of a circular cascade disk.

FIG. 3 shows the side view of a circular cascade disk. In this case the axle (A) is located in the centerpoint of the disk. The drops are spun off from the cascade disk through the holes (B). The cascades (C) are located on the top face of the disk. They are disposed in such a way as to ascend toward the outside. Two up to seven cascades are used, with preference being given to employing two to four cascades. Located in the internal angles of the individual cascades are the holes (B), which are directed obliquely downward and outward. The angle of these holes is between 10 and 80° from the horizontal downward, but preferably between 30 and 60°. The number of holes per cascade, and their diameter, is guided by the volume to be discharged, with the aim of maximizing the uniformity of distribution across the width of the element to be produced. 2 to 8, preferably 4 to 6, perforations are used per cascade. The spacing of the cascades may be distributed uniformly over the radius, or else nonuniformly, in the sense that the spacing becomes greater from inside to outside.

Depending on the design width of the composite element, the cascade disk has a diameter of between 4 to 40 cm, preferably 5 to 30 cm. It is mounted at a distance of 1-20 cm, preferably 3-10 cm, from the outer layer a) or insulation material b) that is to be wetted.

The application of the adhesive from below to the upper outer layer takes place possibly by means of a four-or five-pointed star whose points are curved upward and whose outer contours are shaped with a curvature such that there are no straight lines or acute or obtuse angles present. This star corresponds in its shape preferably to the star described above and depicted in FIG. 1. In this case, again, the adhesive is supplied preferably through the center. While the concave star is turning, the adhesive is applied in the vicinity of the rotational axle and, through centrifugal force, is spun off at the edges. The speed of rotation and the distance from the upper outer layer must be chosen here in such a way that the droplets strike the outer layer before reaching the apex of their trajectory, and as a result of gravity and deceleration are moving downward again.

The inherent curvature of the star is like a sphere section. The height of the sphere section is between 1 and 10 cm. The outer diameter described by rotation of the points of the star is between 8 and 60 cm, but preferably 10 to 40 cm. The inner diameter of the star, on rotation, describes a circular diameter of 2 to 40 cm, but preferably one between 4 and 20 cm.

The material is between 0.5 and 20 mm thick. The star is likewise manufactured from the above-described materials to which polyurethanes stick little if at all. The whole outer edge of the star is likewise of curved configuration, so that in plan view there is no straight line and no acute or obtuse angle. If appropriate, the spin-off edge can again be provided with 2 to 10 additional notches.

The wetting radius of the adhesive is to be set via the rotational speed and spacing of the rotating body in such a way as to cover the entire design width of the sandwich element.

The rotary speed of the rotating flat body is preferably between 200-2500 min$^{-1}$, with particular preference between 200-2000 min$^{-1}$, and in particular between 300-1500 min$^{-1}$.

The amount of adhesive c) applied is between 30-300 g/m$^2$, preferably 40-200 g/m$^2$, with particular preference 50-150 g/m$^2$ per side.

Prior to its application to the rotating flat body, the adhesive c) is mixed in a machine, for which it is possible to use high-pressure or low-pressure mixers, preferably low-pressure mixers, and it is then applied to the rotating flat body via a suitable discharge means, such as a downstream stirring member, for example. If the rotating flat body is set in rotation by means of a drive, the adhesive c) is distributed two-dimensionally over the continuously conveyed outer layer or insulation material located below. The same thing happens when the curved star is used to wet the upper outer layer. The reaction mixture is usually supplied through the rotational axle. Mixing and application of the adhesive to the rotating body can be carried out using, for example, a plastic stirring member. The amount of adhesive c) discharged is harmonized with the speed of the continuously twin belt in such a way as to allow realization of the desired application amount per m$^2$ of metal sheet. First the lower outer layer is provided with adhesive, after which the insulation material is put on, and then, using a further rotating applicator, adhesive is applied to the insulation material for the bonding of the upper outer layer.

In contrast to the prior art the adhesive c) is indeed spun off laterally, but because of the low speed of rotation and the constructional design of the rotating body it is distributed over the outer layer which is located horizontally, preferably parallel to and below or else above the rotating body. Surprisingly, it has now been found that application by means of the technique described above can take place not only without aerosol but also substantially more uniformly across the width.

Aerosols in this context are colloidal systems of gases, such as air, with small liquid particles, of around 10$^{-7}$ to 10$^{-3}$ cm diameter, distributed finely within them.

Within the art the objective stated to date for the adhesive bonding of boards of insulation material to outer layers was to apply a thin film of adhesive that was as coherent as possible. Surprisingly it has now been found that dropwise bonding through droplet application represents a solution which offers significantly greater economy in terms of material, while retaining a strength of adhesion which is greater than the transverse tensile strength of the mineral or organic insulation material.

Surprisingly it has additionally been found that the pattern of application of the adhesive to the outer layers or to the insulation material is more uniform than when using a circular disk, as a result of the shaping of the star-shaped body and of the cascade-like shaping of a circular disk with oblique outlet orifices directed outwardly.

Figure 4:
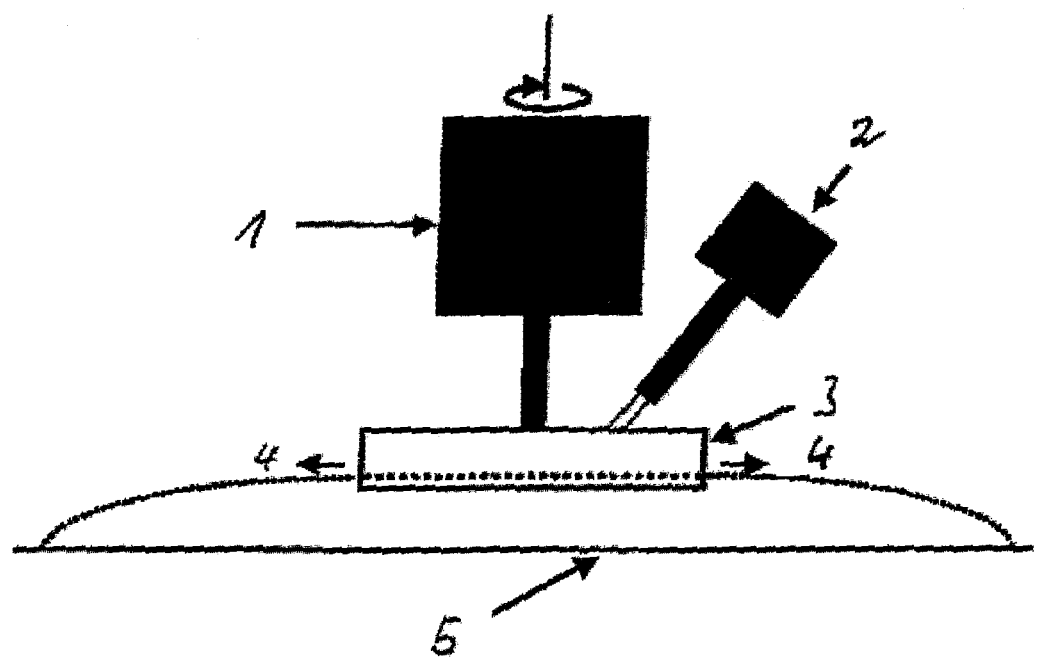
FIG. 4 shows an apparatus for producing sandwich elements using the cascade disk of the invention.

FIG. 4 shows an apparatus for producing sandwich elements using the cascade disk of the invention. The adhesive is applied to the cascade disk (3) via a metering means (2). The adhesive (4) is applied to the lower outer layer (5) via the rotating cascade disk (3), and then the board of insulation material is put on. After that, using a further cascade disk (4b), adhesive can be distributed in turn to the top face of the board of insulation material, and the upper outer layer (4b) can be supplied.

As adhesives c) it is preferred to use isocyanate-based adhesives, more particularly reactive one-component or multicomponent polyurethane systems.

In this context it is possible to use the isocyanate-based adhesives known from the prior art. These adhesives are generally obtainable by reacting polyisocyanates with compounds having two isocyanate-reactive hydrogen atoms, the reaction ratio being chosen preferably such that, in the reaction mixture, the ratio of the number of isocyanate groups to the number of isocyanate-reactive groups is 0.8 to 1.8:1, preferably 1 to 1.6:1.

Polyisocyanates employed are the typical aliphatic, cycloaliphatic, and, in particular, aromatic diisocyanates and/or polyisocyanates. Preference is given to using tolylene diisocyanate (TDI), diphenylmethane diisocyanate (MDI), and, in particular, mixtures of diphenylmethane diisocyanate and polyphenylene-polymethylene polyisocyanates (crude MDI).

Suitable compounds having at least two isocyanate-reactive hydrogen atoms are generally those which in their molecule carry two or more reactive groups selected from OH groups, SH groups, NH groups, NH$_2$ groups, and CH-acidic groups, such as β-diketo groups, for example.

It is preferred to use polyetherols and/or polyesterols, with particular preference polyether polyols. The hydroxyl number of the polyetherols and/or polyesterols used is preferably 25 to 800 mg KOH/g; the molecular weights are generally greater than 400. The polyurethanes can be prepared with or without chain extenders and/or crosslinking agents. Chain extenders and/or crosslinking agents employed include, in particular, alcohols and amines having a functionality of two or three, especially diols and/or triols having molecular weights of less than 400, preferably from 60 to 300.

The polyol component of the adhesive c) preferably has a viscosity of 100-1000 mPas, more preferably 100-800 mpas, with particular preference 100-400 mPas at 35° C.

Within the adhesive c) there may if appropriate be additive or reactive flame retardants. Such flame retardants are used generally in an amount of 0.1% to 30% by weight, based on the total weight of the polyol component.

It is preferred not to add any physical blowing agents to the reaction of the polyisocyanates with the polyols. However, the polyols used may still comprise residual water or else small amounts of water may have been added to them, this water acting as a blowing agent. Consequently the resultant polyurethane adhesives have a density of 40 to 800 g/l, preferably of 50 to 500 g/l, with particular preference of 60 to 200 g/l.

The inorganic mineral, thermal insulation materials b) used as core material for the method of the invention are, in particular, mineral wool or rock wool insulation materials which are typically offered as board product or as interleaved strip product. The inorganic core materials are especially preferred when there is a requirement for a high level of fire security on the part of the composite elements.

Organic thermal insulation materials are commercial boards made of foamed plastics, such as foamed polystyrene (EPS, XPS), foamed PVC, foamed polyurethane, or melamine resin foams.

The density of the polyurethane adhesives used for this purpose is 40 to 800 kg/m$^3$, preferably 50 to 500 kg/m$^3$, more particularly 60 to 200 kg/m$^3$.

The thickness of the composite elements is located typically in the range between 5 to 250 mm.

EXAMPLES

A) Composition of the Adhesive System
A Component

| | | |
|---|---|---|
| 20 parts | polyetherol 1, consisting of sucrose, pentaerythritol, and propylene oxide, functionality 4, hydroxyl number 400 mg KOH/g | |
| 25 parts | polyetherol 2, consisting of glycerol and propylene oxide, functionality 3, hydroxyl number 400 mg KOH/g | |
| 41 parts | polyetherol 3, consisting of propylene glycol and propylene oxide, functionality 2, hydroxyl number 250 mg KOH/g | |
| 10 parts | flame retardant trischloroisopropyl phosphate, TCPP | |
| 2 parts | silicone-containing stabilizer | |
| 1 part | water | |
| 1 part | tertiary amine | |

B Component
Isocyanate Lupranat M20, polymeric MDI (BASF AG)
A and B components were mixed with one another in proportions such that the index was in the region of 110.

B) Composition of the PU System II.
A Component

| | |
|---|---|
| 50 parts | polyetherol 4, consisting of sucrose and propylene oxide, functionality 4.5, hydroxyl number 480 mg KOH/g |
| 25 parts | polyetherol 3, consisting of propylene glycol and propylene oxide, functionality 2, hydroxyl number 250 mg KOH/g |
| 20 parts | flame retardant 1, trischloroisopropyl phosphate, TCPP |
| 0.5 part | water |
| 1.5 parts | silicone-containing stabilizer |
| 3 parts | tertiary amine |

B Component
Isocyanate Lupranat M50, polymeric MDI (BASF AG)
A and B components were reacted in proportions such that the index was in the region of 120.

The adhesive system was mixed at a temperature of 30-50° C. by means of a low-pressure mixing machine (UNIPRE) and was applied to the rotating body by means of a plastic stirring member. The twin belt had a width of 1.2 m and was advanced at a constant speed of 6 m/min. The amounts of adhesive discharged were varied so as to realize application amounts of 100, 120, and 140 g/m². The temperature of the twin belt was 30 to 45° C. The amount discharged for the middle third, and the discharge performance overall, were determined in separate tests. In these tests the reaction mixture was applied to a paper web of constant basis weight. Application took place by applying the reaction mixture emerging from the mixing head to the rotating body. As a result of the rotational movement, the reaction mixture was spun away through the holes in the cascade disk or from the edge of the star-shaped disk and, in the form of droplets, impinged on the lower paper outer layer. After curing, a linear meter of paper web was weighed and divided into three and the amount of the middle third was ascertained.

The difference between total application and application in the middle third is a measure of the distribution of the adhesive across the width of the panel.

After the system had cured, test specimens measuring 100× 100×5 mm were sawn, and the adhesion of the insulation material to the outer layer was determined in accordance with DIN EN ISO 527-1/DIN 53292.

TABLE 1

Experimental parameters and results. Examples 9 and 10 are the comparative examples for the production of sandwich elements with a simple circular disk at which adhesive is spun off from the edge.

| | rotating body bottom | rotating body top | Failure tensile strength middle third | Substrate | Discharge total (g/m²) | Application middle third (g/m²) |
|---|---|---|---|---|---|---|
| 1 | A | A | in min. wool | min. wool | 120 | 105 |
| 2 | A | A | in EPS | EPS | 100 | 88 |
| 3 | B | A | in min. wool | min. wool | 120 | 101 |
| 4 | C | C | in min. wool | min. wool | 140 | 126 |
| 5 | D | A | in min. wool | min. wool | 120 | 100 |
| 6 | D | D | in min. wool | min. wool | 140 | 127 |
| 7 | E | F | in min. wool | min. wool | 100 | 92 |
| 8 | F | F | in EPS | EPS | 120 | 102 |
| 9 | G | G | adhesive/sheet | min. wool | 120 | 83 |
| 10 | H | H | adhesive/sheet | min. wool | 120 | 80 |

In min. wool means: mineral wool adheres more strongly to the sheet than its own tensile strength/transverse tensile strength. A sheet is obtained which is scattered with unpicked mineral wool fibers.

In EPS means: EPS adheres more strongly to the sheet than its own transverse tensile strength. The sheet is scattered with extracted EPS pieces.

Adhesive/sheet means: the amount of adhesive present is insufficient; blank areas remain on the sheet, or the small amount of adhesive remains attached preferentially to the mineral wool fibers, rather than to the sheet

TABLE 2

Star disk geometries used

| Disk | Identification | Geometry | External radius (mm) | Internal radius (mm) |
|---|---|---|---|---|
| A | 4-star disk | flat | 10 | 6 |
| B | 4-star disk | flat | 7 | 4 |
| C | 5-star disk | flat | 12 | 4 |

TABLE 3

Cascade disk and circular disk geometries used

| Disk | Identification | Radius | Number of cascades | Number of holes per cascade | Setting angle of the holes | Diameter of the holes |
|---|---|---|---|---|---|---|
| D | Double cascade disk | 4 cm | 2 | 4 | 45° | 2 mm |
| E | Triple cascade disk | 10 cm | 3 | 4 | 45° | 1.5 mm |
| F | Double cascade disk | 8 cm | 2 | 6 | 45° | 1.5 mm |
| G | Circular disk | 4 cm | — | — | — | — |
| H | Circular disk | 8 cm | — | — | — | — |

With these disks it is possible only to wet lower outer layers or insulation materials from above with adhesive.

The invention claimed is:

1. A method for the production of composite elements comprising:
   providing a thermal insulation material and an outer layer,
   moving the outer layer continuously,
   applying adhesive to the thermal insulation material or the outer layer,
   applying the thermal insulation material to the outer layer to form a composite element comprising the thermal insulation material bonded to the outer layer by the adhesive,
   wherein the adhesive is applied by a rotating flat body which is mounted horizontally or with a slight deviation from the horizontal, of up to 15°.

2. The method according to claim 1, wherein the rotating flat body is a planar star having at least four points.

3. The method according to claim 1, wherein the rotating flat body is a star having at least four points, wherein the points are curved upward.

4. The method according to claim 1, wherein the rotating body is a planar disk having borders ascending in a cascade-like manner.

5. The method according to claim 1, wherein the rotating flat body has a star design, the star design having four or five points.

6. The method according to claim 1, wherein the rotating flat body is a planar star having four or five points, wherein the rotating flat body is designed such that it has no straight lines and only rounded corners.

7. The method according to claim 1, wherein the rotating flat body is a star having four or five points, wherein the points are curved upward.

8. The method according to claim 1, wherein the rotating flat body is a planar disk having borders ascending in a cascade-like manner, wherein outlet orifices are provided in the borders.

9. The method according to claim 1, wherein the rotating flat body is a planar star having four or five points, or the rotating flat body is a planar disk having borders ascending in a cascade-like manner,
   and wherein the adhesive is applied to a lower surface of the outer layer or a top surface of the thermal insulation material, or both the lower surface of the outer layer and the top surface of the thermal insulation material.

10. The method according to claim 1,
    wherein the rotating flat body is a star having four or five points wherein the points are curved upward, or the rotating flat body is a planar disk having borders ascending in a cascade-like manner,
    and wherein the adhesive is applied to an upper surface of the outer layer.

11. The method according to claim 1, wherein the thermal insulation material is selected from the group consisting of mineral wool, rockwool, foamed polystyrene, foamed PVC, foamed polyurethane, and melamine resin foam.

12. The method according to claim 1, wherein the adhesive comprises an isocyanate.

13. The method according to claim 1, wherein the outer layer is selected from the group consisting of plasterboard panel, glass tile, aluminum foil, aluminum sheet, copper sheet, and steel sheet.

* * * * *